Sept. 27, 1932.    J. R. BARRETT    1,879,969
ELECTRIC GENERATING AND DISTRIBUTING SYSTEM
Filed July 31, 1930
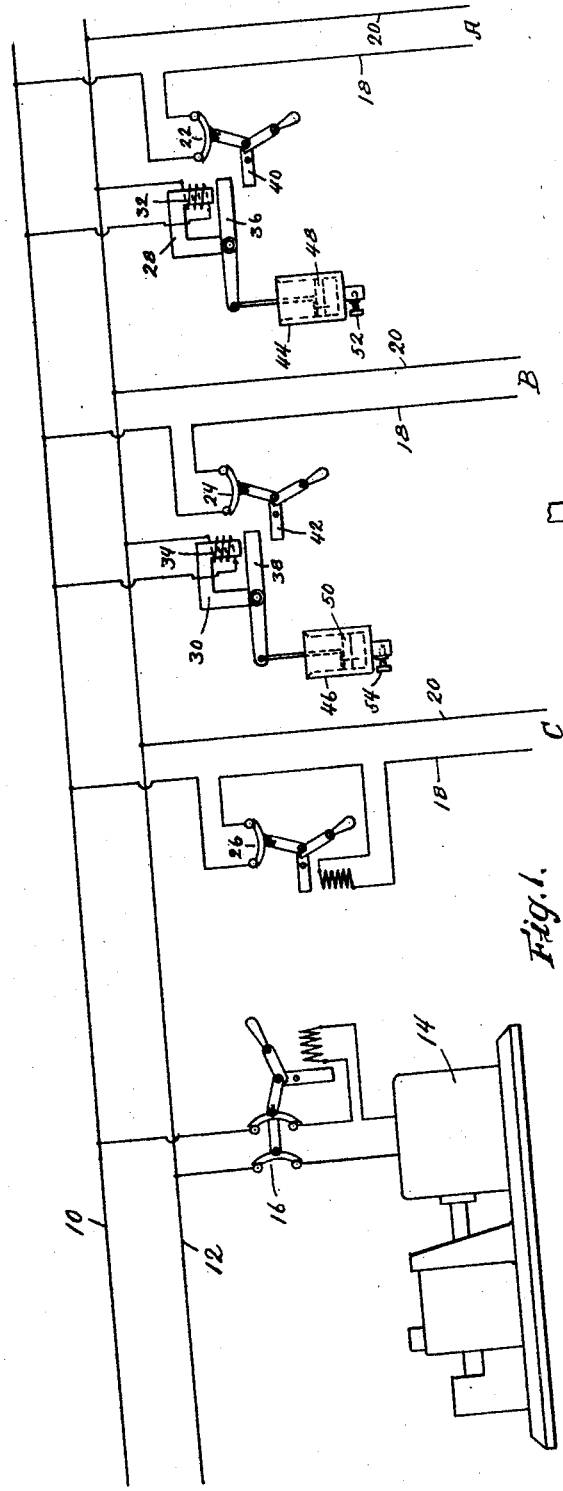
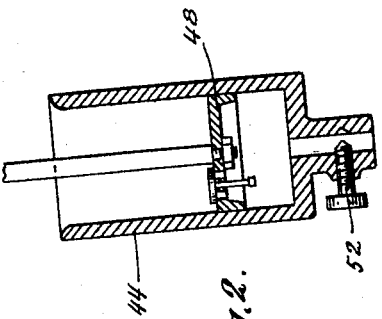
Inventor.
Joseph Robert Barrett Patented Sept. 27, 1932

1,879,969

UNITED STATES PATENT OFFICE

JOSEPH ROBERT BARRETT, OF SOUTH BOSTON, MASSACHUSETTS, ASSIGNOR TO CONDIT ELECTRICAL MANUFACTURING CORPORATION, OF SOUTH BOSTON, MASSACHUSETTS, A CORPORATION OF MASSACHUSETTS

ELECTRIC GENERATING AND DISTRIBUTING SYSTEM

Application filed July 31, 1930. Serial No. 472,143.

This invention relates to electric generating and distributing systems.

An electric generating and distributing system, especially on that supplies power and light for a large factory can become overloaded to such an extent that the generator slows down and can not maintain its normal voltage and frequency. When the voltage and frequency become reduced the speed of the motors energized from the system also become reduced and the effectiveness of operation of much electrical apparatus is impaired.

There are many manufacturing processes that require a constant speed of the driving motors, or constant effectiveness of the electrical apparatus. Consequently a reduction in speed is harmful. There are also certain manufacturing processes, as continuous processes, that require power continuously; and it is costly to interrupt the power except where previous notification of the interruption has been given. Thus, when a generating and distributing system that supplies the various factory circuits becomes overloaded, there is danger that the power supplied to certain circuits may become interrupted when it is essential that these circuits are continuously energized. There are usually a number of circuits supplied by the generating system that, while desirable to maintain energized, are not particularly essential and that can be cut out of the system in an emergency, whereby to reduce the load on the system and thus permit the essential circuits to be maintained energized.

Consequently an object of the present invention is to provide an electric generating and distributing system that supplies a number of circuits some of which are more essential to be maintained energized than others, with improved means automatically responsive to the overloading of the system, and particularly to the reduction of the potential or frequency, or both, of the system to cut out the circuits of minor importance one by one in a preconceived manner until sufficient load has been taken off the system to maintain normal voltage and frequency upon the remaining connected circuits.

A further object of the invention is the provision of an electric generating and distributing system which supplies a number of circuits of varying importance with means associated with each circuit and responsive to a reduction of voltage or frequency, or both, after a period of time following the reduction of voltage or frequency which period of time is different for each circuit, to isolate its circuit from the system providing the reduction of voltage or frequency endures for more than the period of time during which the aforesaid means is adjusted.

A further object of the invention is generally to improve the operation of electric generating and distributing systems and the control of circuits associated therewith.

Fig. 1 is a diagrammatic representation of an electric generating and distributing system incorporating the present invention.

Fig. 2 is a sectional detail of a timing device.

In Fig. 1 the generating and distributing system has the distribution line comprising conductors 10 and 12 which are supplied with power by the turbine-driven alternating current generator 14 through the overload-opening circuit breaker 16. A plurality of power supplying branch circuits A, B, C, are connected with the system, each having conductors 18 and 20 that are connected with the distribution conductors 10 and 12 and are extended to locations where they are connected with various power consuming devices, not shown.

As herein shown, certain branch circuits, as circuits A and B, are assumed to supply power to apparatus that can be de-energized, if necessary, upon the overloading of the generator and the system, and other circuits, as the circuit C, supply apparatus that must be maintained energized regardless of the overloading of the system.

In accordance with this invention, means are provided to disconnect the various circuits one by one in preconceived order from the system when the system becomes overloaded and the frequency or potential becomes reduced. The disconnecting means are so arranged that the least essential circuit is disconnected first, the circuit next in importance, second, and so on, until enough circuits have been removed to reduce the load to normal and thus keep power on the essential circuits. The circuits A, B, C, are provided with circuit breakers 22, 24, and 26, respectively, which can be of any desired type. The circuit breakers 22 and 24 are associated with relay devices 28 and 30, respectively, that are connected to the system conductors 10 and 12 so that they are responsive to variations in voltage or in frequency of the system. The particular relay devices herein shown are adapted to be responsive to voltage variations and particularly to a voltage reduction. Since, however, similar relays will be responsive to variations in frequency, it is considered unnecessary to duplicate the relays for the purpose of showing that the circuit breakers are also responsive to a frequency reduction. The relays 28 and 30 have energizing windings 32 and 34 that, when the system is normal maintain armatures 36 and 38, in attracted and raised position. When, however, the voltage or frequency of the system drops below a predetermined amount, said armatures are adapted to be released and to fall into engagement with the latches 40 and 42 of the circuit breakers 22 and 24 whereby to open the circuits associated with said breakers. Timing devices 44 and 46 are associated with said relay mechanisms and, as here shown, include dash pots, the pistons 48 and 50 of which are connected respectively to the armature 36 and 38. The timing devices are adjustable as to their time of operation by leak valves 52 and 54, see especially Fig. 2, which control the rate of admission of air into the dash pots under the pistons as the pistons are moved upwardly by the downwardly moving armatures 36 and 38. Thus the timing devices prevent the armatures from opening the circuit breakers until the expiration of some period of time after the occurrence of the undervoltage that causes the release of the armatures. In accordance with this invention, each timing device is set for a different time period of operation so that the period of undervoltage must endure for a predetermined time before circuit A is disconnected from the system and for a longer period of time before circuit B is disconnected from the system. The more essential the circuit is, the longer will be the time setting of the timing device associated therewith. With this arrangement circuit A will trip open first, circuit B next, and so on. Thus the circuits will trip out in succession each removing a part of the load of the system. Thus when one or a sufficient number of the lesser essential circuits have been tripped out, the load will be reduced and consequently the voltage and frequency will be restored to normal before the time required for the remaining connected circuits to open. Upon restoration of voltage or frequency the relay devices of the remaining connected circuits will automatically reset or be restored to their attracted raised positions. Thus the most essential circuits and whatever less essential circuits remain will still be connected to the system.

I claim:

1. An electric generating and distributing system having a common feeder circuit and a plurality of load circuits of varying importance energized from said feeder circuit, and separate means associated with each load circuit which is directly responsive to a condition in said feeder circuit that results from an overload on the system to disconnect said load circuits from the system, each circuit separately from all others, in the inverse order of their importance until enough load has been disconnected from the system to reduce the loading thereof to a normal value, whereby to reduce the total load on the system and permit the more essential load circuits to remain normally energized.

2. An electric generating and distributing system having a plurality of load circuits, each circuit having means which disconnects it from the system, and each disconnecting means having time-controlled means for operating it independently of the operation of any other time-controlled means, which time controlled means is responsive to a condition of the system that is a function of the overload thereon, the time period of operation of each time-controlled means being different so that the circuits are disconnected from the system one by one in succession.

3. An electric generating and distributing system having a plurality of load circuits, circuit breakers connecting said circuits with the system, an undervoltage device associated with each circuit breaker and responsive to a reduction in voltage of the system for effecting the opening of its respective circuit breaker independently of all other breakers, and a timing device associated with each undervoltage device and its respective circuit breaker for determining the period of time that the reduction of voltage persists on the system before the circuit breaker is opened, each undervoltage device being set to provide a different period of time of operation so that the circuits are disconnected from the system one at a time in a preconceived manner during the continuance of the voltage reduction.

4. An electric generating and distributing system having a plurality of load circuits, and time-governed disconnecting means responsive to a function of an overloaded condition of the system associated with each circuit, each disconnecting means being operable independently of all other means and the timing of each disconnecting means being different so that the circuits are disconnected in succession during the continuance of the overloaded condition of the system.

5. An electric generating and distributing system having a plurality of load circuits, and means for disconnecting said circuits in predetermined order in succession from the system upon an overload on the system whereby to remove the overload, comprising a circuit breaker separately connecting each circuit with the system, and an undervoltage breaker-opening means associated with each breaker having time-controlled means that withhholds the opening means from operation until the undervoltage condition has endured for the period of time for which said time-controlled means is set, each undervoltage means being operable independently of all other undervoltage means and the time-setting of each time-controlled means being different so that the circuits are removed from the system in predetermined order until the undervoltage condition disappears.

6. An electric generating and distributing system having a plurality of load circuits, a generator supplying energy to said system which is adapted to slow-down when overloaded, and time-delayed means associated with each circuit and responsive to the slowing down of the generator to remove its circuit from the system independently of the removal of any other circuit from the system, the period of time delay being different for each circuit so that the circuits are removed from the system in predetermined successive order.

7. In an electric generating and distributing system, the combination of a main feeder circuit, a plurality of load circuits, a circuit breaker separately connecting each load circuit with said feeder circuit, a plurality of undervoltage relays continuously energized from said feeder circuit, one of which is associated with and governs the tripping of each circuit breaker, and means providing adjustable time-delayed operation of said relays, whereby to determine the tripping order of said circuit breakers.

8. In an electric generating and distributing system, the combination of a plurality of load circuits, a main feeder circuit common to all of said load circuits, a circuit breaker connecting each load circuit to said feeder circuit, and separate time-delayed tripping means associated with each circuit breaker which are responsive to voltage conditions in said feeder circuit and which are operative independently of the similar means of all other breakers to disconnect said load circuits from the system in a predetermined order.

In testimony whereof, I have signed my name to this specification.

JOSEPH ROBERT BARRETT.